United States Patent
Ashby

[15] 3,654,805
[45] Apr. 11, 1972

[54] CLUTCH REBUILDING AND TESTING MECHANISM

[72] Inventor: Robert L. Ashby, 3018 Ashwood Avenue, Evansville, Ind. 47714

[22] Filed: June 19, 1970

[21] Appl. No.: 47,766

[52] U.S. Cl. .............................................. 73/118, 269/25
[51] Int. Cl. ...................................................... G01m 13/02
[58] Field of Search .................................. 73/118; 269/25, 34

[56] References Cited

UNITED STATES PATENTS 3,452,591   7/1969   Phillips et al. .......................... 73/118

*Primary Examiner*—Jerry W. Myracle
*Attorney*—Warren D. Flackbert

[57] ABSTRACT

A clutch rebuilding and testing mechanism characterized by the use of three cooperating power members arranged to simply and positively control structure which positions the clutch for servicing without the need for any superstructure above such clutch.

7 Claims, 9 Drawing Figures

3,654,805
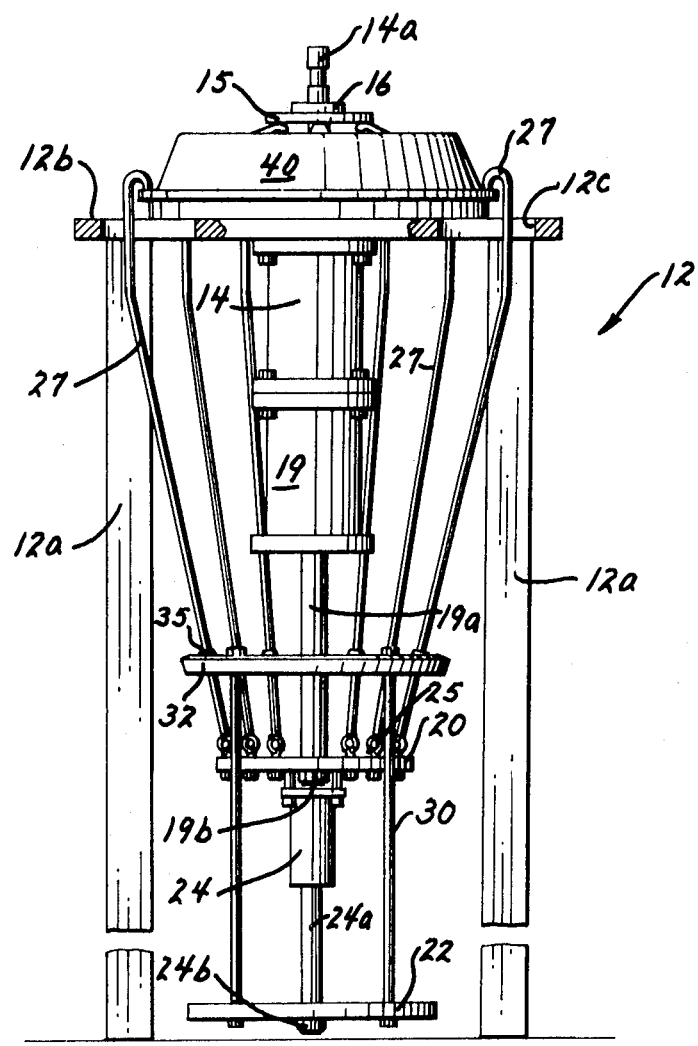
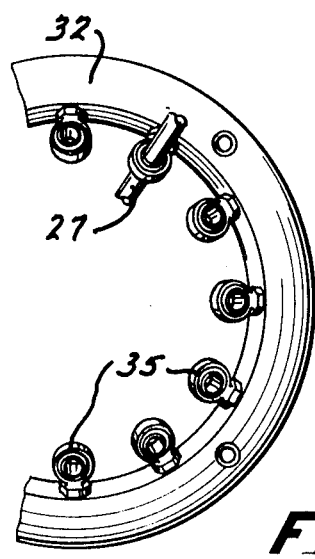
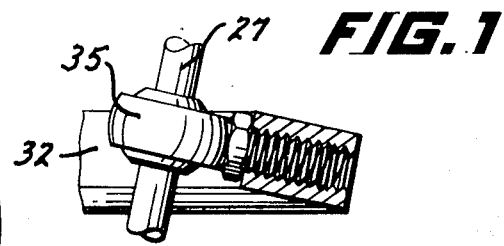
FIG. 1
FIG. 6
FIG. 5
INVENTOR
ROBERT L. ASHBY
BY Warren D. Hackbert
ATTORNEY

INVENTOR
ROBERT L. ASHBY

BY Hamen D. Hackbert
ATTORNEY

INVENTOR
ROBERT L. ASHBY
BY Karen D. Hackbert
ATTORNEY

CLUTCH REBUILDING AND TESTING MECHANISM

As is known, a need exists for equipment for testing, adjusting and/or rebuilding clutches, such as the type described and claimed in U.S. Pat. No. 3,473,373 of the inventor herein and having the same title. While the equipment of the aforesaid patent has provided excellent results in use, it has become evident that a more simplified approach to the positioning of the clutch for servicing would be advantageous.

Accordingly, while the end results of the invention herein are the same as those of the earlier U.S. Pat. No. 3,473,373, a new approach is provided for clutch servicing. Briefly, the invention employs three power members, such as hydraulic cylinders with associated shafts or pistons, referred to as the upper power member, the intermediate power member and the lower power member. The upper power member provides the servicing function for the mechanism, similar to that shown in U.S. Pat. No. 3,473,373, while the intermediate and lower power members serve the positioning function.

In this connection, a series of upstanding arms having hooklike or curved end portions for engaging the rim of a clutch are pivotally mounted around the periphery of the upper surface of an upper plate member. The aforesaid arms pass through a series of eye members carried by a ring, where the latter connects to a lower plate member through a support framework. The lower plate member is movable through operation of the lower power member.

In other words, as the lower power member functions, i.e., its piston moves upwardly, the lower plate member moves upwardly, as well as the ring, forcing an inward pivotal movement of the arms to a position where the hooklike end portions thereof are disposed above the rim of the clutch. At such time, the intermediate power member is caused to operate, its piston or shaft moving downwardly, forcing the hooklike end portions of the arms into a clamping relationship with the rim of the clutch.

The same end results are achieved through an alternative embodiment of the invention, representing a savings in vertical space. In this connection, the lower power member is mounted off one side of the upper plate member, the piston thereof connecting, through other structure, to the ring. As before, actuation of the lower power member moves the ring upwardly, forcing the arms to an operative position, awaiting actuation of the intermediate power member.

With an arrangement of either type, no superstructure is required for positioning the clutch into a servicing condition, where, it might be noted, the working surface of the mechanism includes radial slots through which the hooklike end portions of the arms extend to accomplish the preceding desired pivoting and clamping function. As mentioned, the upper power member is utilized to effect the servicing of a clutch after positioning.

A better understanding of the present invention will become more apparent from the following description, taken in conjunction with the accompanying drawings, wherein FIG. 1 is a view in side elevation, partly fragmentary, showing the mechanism of the preferred embodiment of the invention;

FIG. 5 is a fragmentary top plan view of the ring forming part of the invention, showing the manner in which an arm extends through one of the eye portions mounted thereon;

FIG. 6 is a fragmentary view in side elevation, also in vertical section, showing an arm extending through an eye portion on the ring of FIG. 5;

Figure 7:
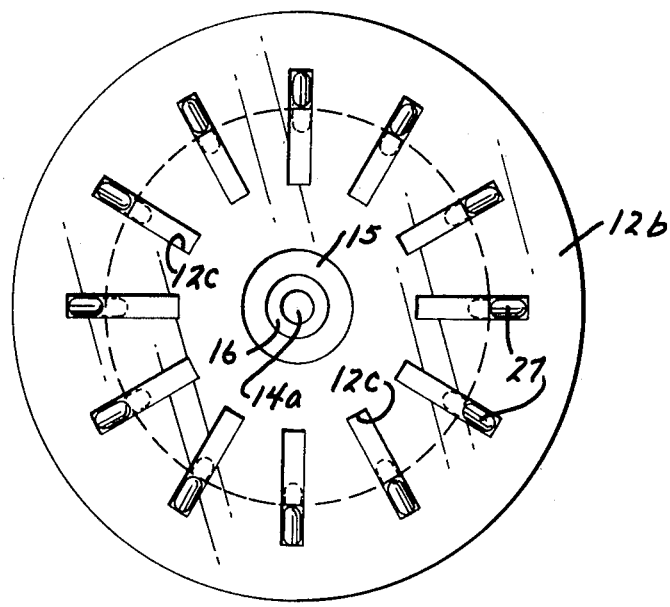
FIG. 7 is a top plan view of the working surface showing details of the radial slots and a broken line outline of a clutch.

For the purposes of promoting a better understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIG. 1, the invention typically comprises a framework 12 defined by legs 12a supporting a working surface 12b, the latter being in the form of a disc having a series of radial slots 12c extending therethrough (see FIG. 7). The working surface 12b supports upper power member 14 on the undersurface thereof, the piston or shaft 14a thereof being adapted to receive an adapter or pressure plate 15, and, typically, a horseshoe washer 16, all of which are known in the art.

Intermediate power member 19 is bolted onto the lower end of upper power member 14, where piston or shaft 19a thereof extends downwardly and is received in an opening in upper plate member 20, where a shoulder and a bolt 19b serve to provide a positive assembly. Lower power member 24 is secured to the undersurface of the upper plate member 20 and its piston or shaft 24a is secured to lower plate member 22, assembly again being accomplished through a shoulder and a bolt 24b.

Figure 2:
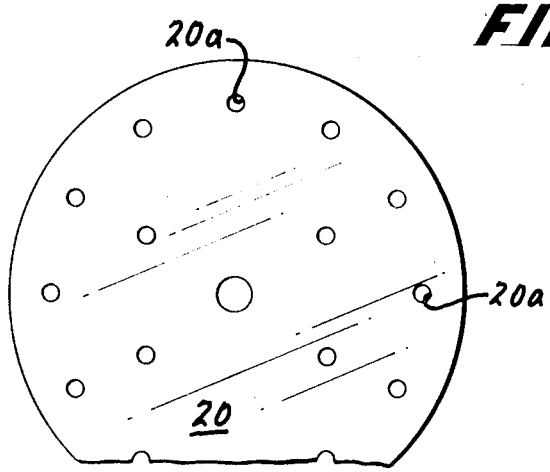
FIG. 2 is a top plan view, partly fragmentary, showing the upper plate member forming part of the invention.
Figure 3:
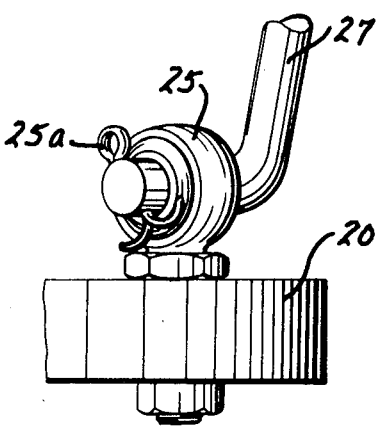
FIG. 3 is a view in side elevation, also partly fragmentary, showing an arrangement for mounting one of the arms on the upper plate member of FIG. 2.
Figure 4:
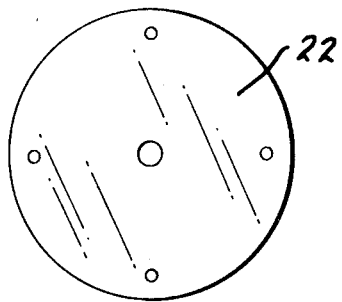
FIG. 4 is a top plan view of the lower plate member of the invention.

With reference to FIGS. 2 and 3, the upper plate member 20 has a series of peripheral openings 20a therethrough adapted to position mounting elements 25, the latter each having an opening therethrough for receiving an end of a clamping arm 27. Each arm 27 is retained for pivotal action through the use of a cotter pin 25a.

Frame members 30 have the lower end of each secured to lower plate member 22 and the upper end secured to a ring 32. The ring 32 typically includes a series of threadedly positioned angled eyes 35, each eye 35 having an opening through which a portion of an arm 27 is received for sliding action. As should be apparent, the upper end of each arm 27 curves downwardly, being adapted to releasably engage a rim defined on a clutch 40 under process.

In use, the clutch 40 which is to be serviced is positioned on the working surface 12b. When lower power member 24 is actuated, the lower plate member 22 moves upwardly, as does the ring 32. Such action affects inward radial pivotal movement of the arms 27, so that the hooklike or curved upper ends thereof are disposed in a position above the rim of clutch 40. Intermediate power member 19 is then actuated, meaning that its piston or shaft 19a moves upper plate member 20 downwardly, causing a clamping relationship between the upper ends of arms 27 and the rim of clutch 40. Actually, the ring 32, the upper plate member 20 and the lower plate member 24 all move simultaneously upon the movement of piston or shaft 19a of intermediate power member 19.

Figure 8:
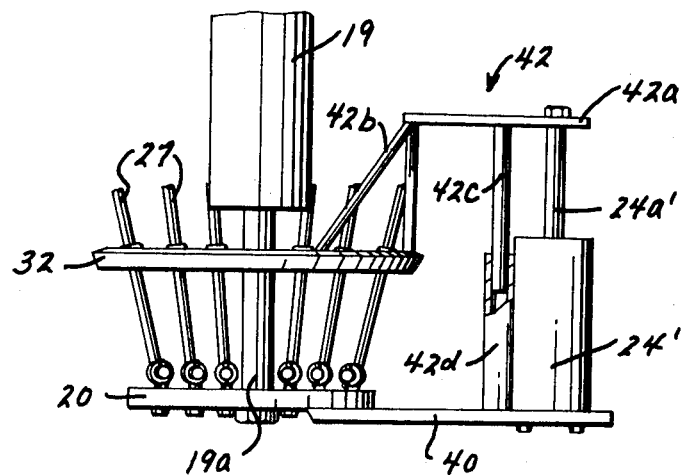
FIG. 8 is a view in side elevation, partly fragmentary, showing an alternative arrangement of the invention; and, FIG. 9 is a top plan view, looking down in FIG. 8, and also partly fragmentary, showing further details of the alternative arrangement of such figure, with certain components removed for drawing clarity.
Figure 9:
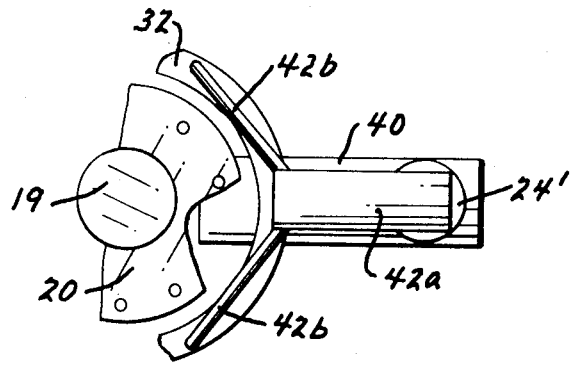

With reference to FIGS. 8 and 9, a vertical space saving arrangement for the invention is illustrated, where comparable components bear the same reference numerals. In the FIGS. 8 and 9 embodiment, a support member 40 extends outwardly from the upper plate member 20. A power member 24', substituted for lower power member 24, is disposed on support member 40, the piston 24a' of which connecting to a lifting assembly 42, typically defined by a generally horizontal plate member 42a, struts 42b and a steadying member 42c depending from plate member 42a. The steadying member 42c reciprocates in a cylinder 42d adjacent power member 24'. The struts 42b are secured to the ring 32.

The end results during use are the same as in connection with the earlier discussed invention embodiment. In other words, when power member 24' is actuated, its piston 24a' moves upwardly, where, at the same time, ring 32 moves upwardly. The latter upward movement causes the arms 27 to move in a position over the rim of the clutch, where further operation is as discussed earlier.

The invention accomplishes positive placement of a clutch for testing, rebuilding or checking. The upper power member 14 is used in connection with the preceding functions, all in a known manner. As stated above, the invention obviates the need for any superstructure above the working surface and, therefore, provides a minimum of parts and an even more positive action over equipment already known. The invention is, of course, susceptible to various changes, such as proportioning, specific type of power member employed, configuration of the ring or of the plate members, or the like, and, thus, the preceding description should be considered illustrative.

I claim:

1. A clutch rebuilding and testing mechanism comprising a framework, a receiving surface for said clutch on said framework, said receiving surface having radially slotted portions, a first power member mounted on said framework, a second power member secured to said first power member and having a shaft positioning a first plate member, a third power member mounted on said first plate member and having a shaft positioning a second plate member, a plurality of clamping arms pivotally mounted on said first plate member and having free ends extending through said radially slotted portions in said receiving surface, and a ring connecting to said second plate member, said clamping arms pivoting inwardly upon actuation of said third power member and movement of said ring, and said free ends of said clamping arms engaging said clutch upon actuation of said second power member.

2. The clutch rebuilding and testing mechanism of claim 1 where said second power member is selectively actuated after said third power member is actuated.

3. The clutch rebuilding and testing mechanism of claim 1 where said ring is above said first plate member.

4. The clutch rebuilding and testing mechanism of claim 1 where frame members interconnect said ring and said second plate member.

5. The clutch rebuilding and testing mechanism of claim 1 where said clamping arms extend through eye portions on said ring.

6. The clutch rebuilding and testing mechanism of claim 1 where said first power member, said second power member and said third power member are in alignment.

7. A clutch rebuilding and testing mechanism comprising a framework, a receiving surface for said clutch on said framework, said receiving surface having radially slotted portions, a first power member mounted on said framework, a second power member secured to said first power member and having a shaft positioning a first plate member, a third power member mounted on said first plate member, a plurality of clamping arms pivotally mounted on said first plate member and having free ends extending through said radially slotted portions in said receiving surface, and a ring connecting to said third power member, said clamping arms pivoting inwardly upon actuation of said third power member and movement of said ring, and said free ends of said clamping arms engaging said clutch upon actuation of said second power member.

* * * * *